US008832352B2

(12) United States Patent
Tsirkin et al.

(10) Patent No.: US 8,832,352 B2
(45) Date of Patent: Sep. 9, 2014

(54) HYPERVISOR-DRIVEN PROTECTION OF DATA FROM VIRTUAL MACHINE CLONES

(75) Inventors: Michael Tsirkin, Yokneam Yillit (IL); Dor Laor, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 209 days.

(21) Appl. No.: 13/484,219

(22) Filed: May 30, 2012

(65) Prior Publication Data
US 2013/0326110 A1  Dec. 5, 2013

(51) Int. Cl.
*G06F 12/00*  (2006.01)

(52) U.S. Cl.
USPC ............................... 711/6; 711/163; 711/170

(58) Field of Classification Search
USPC .............................................. 711/6, 163, 170
See application file for complete search history.

(56) References Cited

U.S. PATENT DOCUMENTS

2012/0324236 A1* 12/2012 Srivastava et al. ............. 713/189
2013/0191924 A1*  7/2013 Tedesco et al. ................. 726/26

* cited by examiner

*Primary Examiner* — Shawn X Gu
(74) *Attorney, Agent, or Firm* — Lowenstein Sandler LLP

(57) ABSTRACT

A system and method for protecting secure data from virtual machine clones are disclosed. In accordance with one embodiment, a hypervisor transmits a message to a guest operating system hosted by a first virtual machine, where the message identifies a memory location for a secure datum. After the transmission of the message, when the hypervisor receives a direct-copy command to clone the first virtual machine, the hypervisor creates a second virtual machine via direct copy, where the second virtual machine is not provided access to the secure memory location during its creation.

26 Claims, 17 Drawing Sheets

HYPERVISOR-DRIVEN PROTECTION OF DATA FROM VIRTUAL MACHINE CLONES

RELATED APPLICATIONS

The present application is related to co-pending patent application Ser. No. 13/484,110, entitled "Protection of Data From Virtual Machine Clones Via Paravirtualization," filed on 30 May 2012.

TECHNICAL FIELD

This disclosure relates to computer systems, and more particularly, to cloning of virtual machines in virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine" or a "physical machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps, typically in a one-to-one fashion, to a device of the host machine (e.g., a network interface device, a CD-ROM drive, a hard disk, a solid-state drive, etc.). A virtual machine may also comprise a "virtual virtual memory" that maps memory locations of the virtual machine, typically organized into pages, to virtual memory locations of the host operating system, via a paging table for the virtual machine. The virtual memory locations of the host operating system, also typically organized into pages, are then mapped by the host OS to physical memory locations, via the host operating system's paging table. The hypervisor manages these mappings in a transparent fashion, thereby enabling the guest operating system and applications executing on the virtual machine to interact with the virtual processors and virtual devices as though they were actual physical entities.

Typically, a hypervisor enables the cloning of virtual machines via one of two techniques: via a direct-copy command, and via a copy-on-write command. In direct-copy, a source virtual machine is cloned by allocating and creating a new destination virtual machine that is an exact replica of the source virtual machine. In copy-on-write, a source virtual machine is cloned by creating a new pointer to the source virtual machine, so no new virtual machine is created. As expected, changes to the source virtual machine are also mirrored in the "clone" VM accessed via the pointer.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
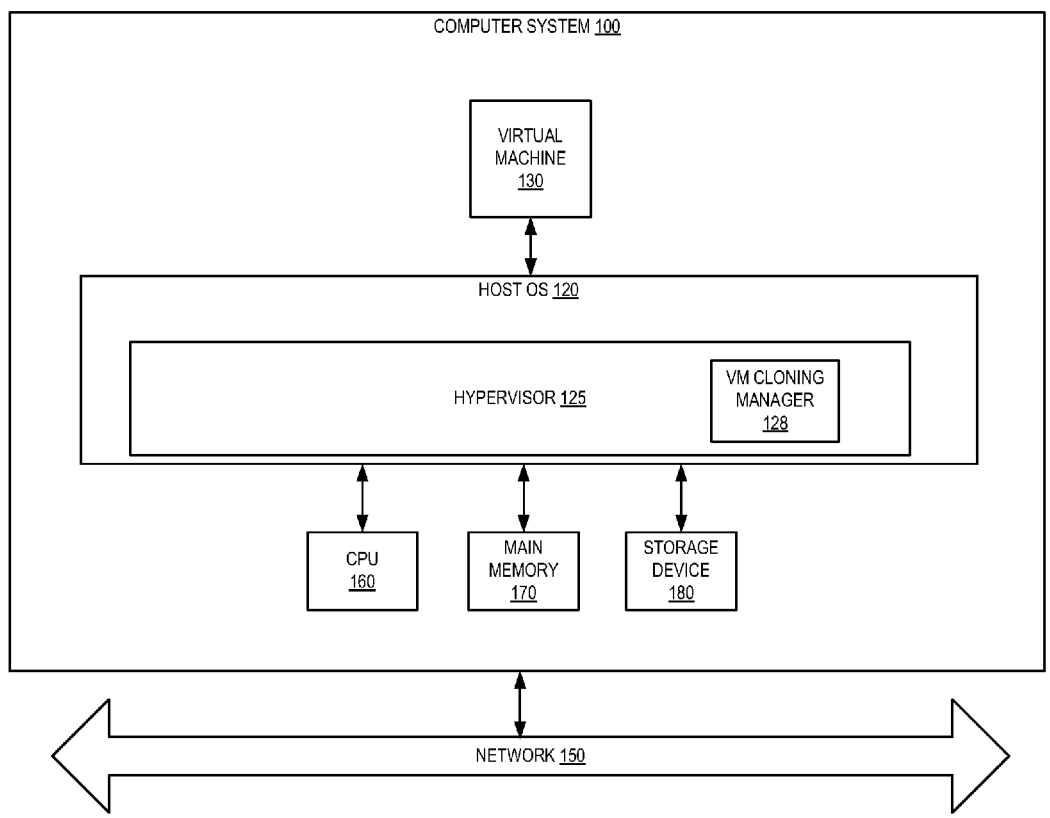
FIG. 1 depicts an exemplary computer system architecture, in accordance with an embodiment of the present invention.

When a virtual machine (VM) stores secure data (e.g., data that is to be kept secret, such as a password, a private encryption key, etc.) in memory (e.g., in main memory such as a Random Access Memory [RAM], in a storage device such as a magnetic disk, etc.), and the VM is cloned, then in virtualized computer systems of the prior art, the clone will also have access to the secure data, unless the computer system has specialized hardware for keeping the data secret, such as a trusted platform module (TPM). Described herein is a system and methods for preventing a VM clone from accessing secure data, without requiring any such specialized hardware. The system and methods are based on a technique known as "paravirtualization," in which a guest operating system is modified and recompiled to execute on top of a hypervisor. More particularly, in accordance with one embodiment, a guest operating system of a first virtual machine is modified so that it is capable of receiving a special message from the hypervisor that identifies a memory location for storing a secure datum. Subsequently, when the hypervisor receives a direct-copy command to clone the first virtual machine, the hypervisor creates a second virtual machine via direct copy, such that the second virtual machine is not provided access to the secure memory location during its creation.

Further, when the hypervisor receives a copy-on-write command to clone the first virtual machine, then in one embodiment the hypervisor creates a pointer to the first virtual machine, and subsequently, when the guest OS receives a request to read the secure datum via the pointer (e.g., via the clone), the hypervisor refuses to execute the request. A number of alternative embodiments for handling direct-copy and copy-on-write cloning commands are also disclosed, such as an embodiment in which a non-secure datum is returned instead of the secure datum in response to a read request by a clone.

Embodiments of the present disclosure are thus capable of protecting secure data from being accessed by cloned virtual machines, without requiring additional hardware, as is the case in virtualized computer systems of the prior art. In addition, the various embodiments of the present disclosure provide an array of attractive implementation options for VM system developers and administrators.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "transmitting", "storing", "creating", "executing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 depicts an exemplary architecture of the salient elements of a computer system 100, in accordance with an embodiment of the present invention. One skilled in the art will appreciate that other architectures for computer system 100 are possible, and that the implementation of a computer system utilizing embodiments of the invention are not necessarily limited to the specific architecture depicted by FIG. 1.

As shown in FIG. 1, the computer system 100 is connected to a network 150 and comprises central processing units (CPU) 160, main memory 170, which may include volatile memory devices (e.g., random access memory (RAM)), non-volatile memory devices (e.g., flash memory), and/or other types of memory devices, and storage device 180 (e.g., a magnetic hard disk, a Universal Serial Bus [USB] solid state drive, a Redundant Array of Independent Disks [RAID] system, a network attached storage [NAS] array, etc.). The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

It should be noted that although, for simplicity, a single CPU is depicted in FIG. 1, in some other embodiments computer system 100 may comprise a plurality of CPUs. Similarly, in some other embodiments computer system 100 may comprise a plurality of storage devices 180, rather than a single storage device 180.

Computer system 100 runs a host operating system (OS) 120, which is software that manages the hardware resources of the computer system and that provides functions such as interprocess communication, scheduling, virtual memory management, and so forth. In one embodiment, host operating system 120 also comprises a hypervisor 125, which provides a virtual operating platform for virtual machine 130 and that manages its execution. In accordance with this embodiment, hypervisor 125 includes a VM cloning manager 128 that is capable of cloning a VM while preventing access by the clone to data that the original VM has designated as secure, as described below with respect to FIGS. 3 through 16. It should be noted that in some alternative embodiments, hypervisor 125 may be external to host OS 120, rather than embedded within host OS 120.

Virtual machine 130 is a software implementation of a machine that executes programs as though it were an actual physical machine. It should be noted that although, for simplicity, a single virtual machine is depicted in FIG. 1, in some other embodiments computer system 100 may host a plurality of virtual machines. Virtual machine 130 is described in more detail below with respect to FIG. 2.

Figure 2:
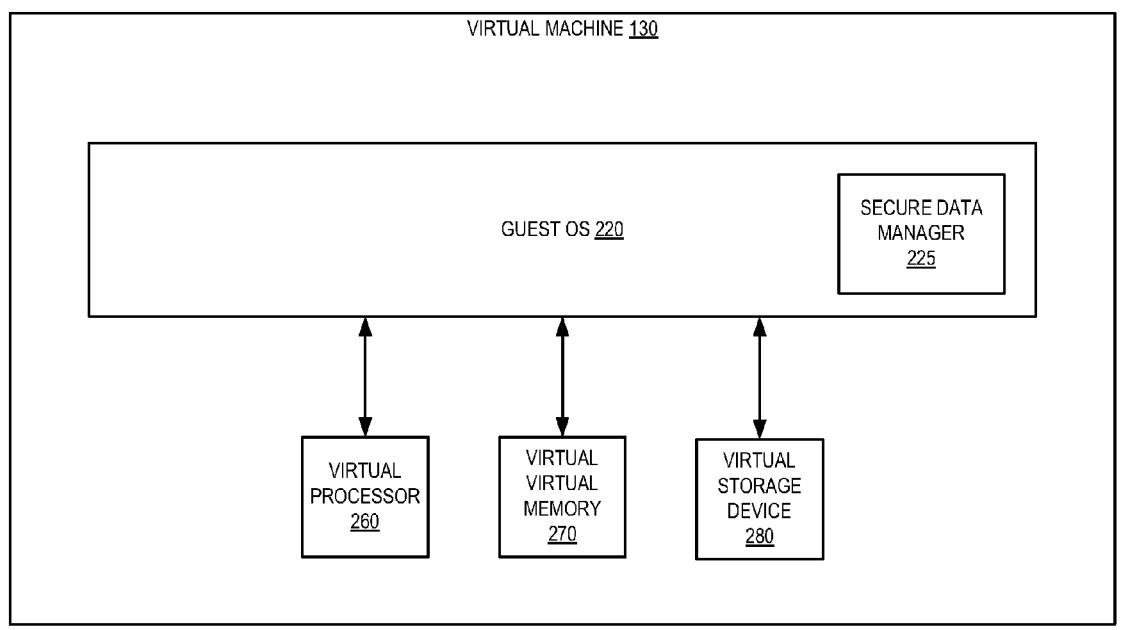
FIG. 2 depicts a block diagram of the salient elements of a virtual machine, in accordance with an embodiment of the present invention.

FIG. 2 depicts a block diagram of the salient elements of virtual machine 130, in accordance with an embodiment of the present invention. As shown in FIG. 2, virtual machine 130 comprises a guest operating system 220, a virtual processor 260, a virtual virtual memory 270, and a virtual storage device 280.

Guest operating system (OS) 220 is software that manages the execution of programs within virtual machine 130. In addition, guest OS 220 includes a secure data manager 225 which is software capable of receiving messages from hypervisor 125 that identify secure memory locations (e.g., of main memory 170, of storage device 180, of a physical device not depicted in the Figures, of a virtual device not depicted in the Figures that is mapped to a physical device, etc.), and of storing secure data in the secure memory locations, as described below with respect to FIG. 3.

Virtual processor 260 emulates a physical processor and maps to central processing unit (CPU) 160. Similarly, virtual storage device 280 emulates a physical storage device and maps to storage device 180. Virtual virtual memory 270 maps virtual addresses of virtual machine 130 to addresses of the host OS 120's virtual memory, which in turn maps to physical addresses in main memory 170. In one embodiment, hypervisor 125 manages these mappings in a transparent fashion, so that guest OS 220 and applications executing on virtual machine 130 interact with virtual processor 260, virtual virtual memory 270, and virtual storage device 280 as though they were actual physical entities. As noted above, in embodiments where computer system 100 comprises a plurality of CPUs 160, rather than a single CPU, virtual machine 130 may also comprise a plurality of virtual processors 260. Similarly, in embodiments where computer system 100 comprises a plurality of storage devices 180, rather than a single storage device, virtual machine 130 may also comprise a plurality of storage devices 180.

Figure 3:
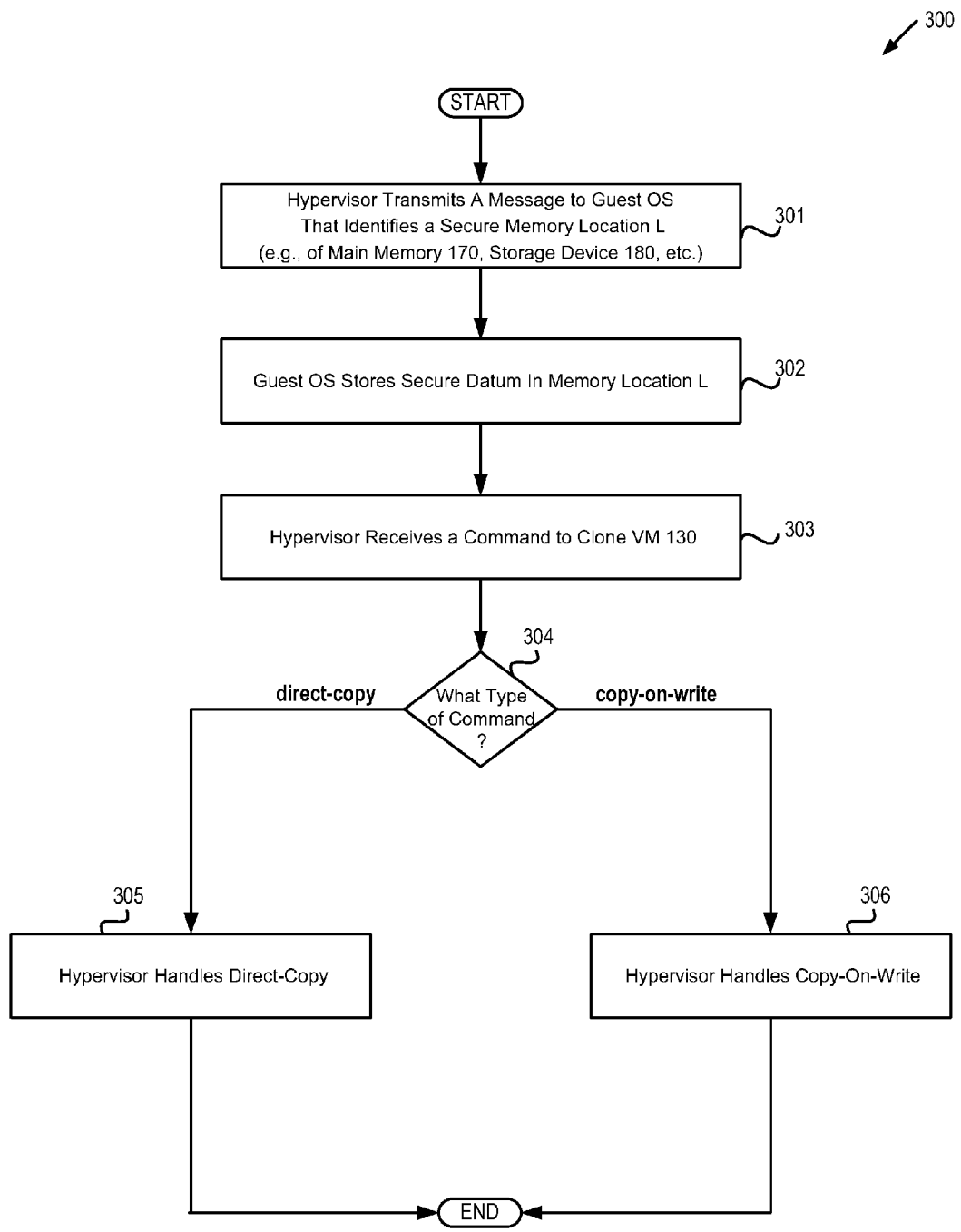
FIG. 3 depicts a flow diagram of one embodiment of a method for protecting secure data from virtual machine clones.

FIG. 3 depicts a flow diagram of one embodiment of a method 300 for protecting secure data from virtual machine clones. The method is performed by processing logic that may comprise hardware (circuitry, dedicated logic, etc.), software (such as is run on a general purpose computer system or a dedicated machine), or a combination of both. In one embodiment, the method is performed by the computer system 100 (e.g., VM cloning manager 128 of hypervisor 125 and/or secure data manager 225 of VM 130) of FIG. 1, while in some other embodiments, some or all of the method might be performed by another machine.

At block 301, hypervisor 125 transmits a message to guest OS 220 that identifies a secure memory location L (e.g., of main memory 170, of storage device 180, of a physical device, of a virtual device that is mapped to a physical device, etc.). The address of memory location L may be an address (physical or virtual) in the host OS 120 that is translated by hypervisor 125 to a physical memory address of guest OS 220, and may include, for example, an identifier of a disk and sector address within the disk.

At block 302, guest OS 220 stores a secure datum (e.g., a private decryption key, a password, etc.) in memory location L. In one embodiment, block 302 may be performed by secure data manager 225 on behalf of guest OS 220, while in some other embodiments block 302 may be performed by a "usual" write operation of guest OS 220. It should be noted that in some embodiments although block 302 occurs after the receiving of the message at block 301, the storing of the secure datum at block 302 is not in response to the message received at block 301, and guest OS 220 may not do anything in response to the message received at block 301.

At block 303, hypervisor 125 receives a command to clone virtual machine 130. The command may be submitted by a human administrator, or may be issued by a program executed by host OS 120.

Block 304 branches based on the type of cloning command received at block 303. If the command is direct-copy, then execution continues at block 305; otherwise the command is copy-on-write and execution continues at block 306. In one embodiment, block 304 is performed by VM cloning manager 128.

At block 305, hypervisor 125 handles the direct-copy command. Some embodiments of the operation of hypervisor 125 at block 305 are described in detail below with respect to FIGS. 4 through 9. In one embodiment, block 305 is performed by VM cloning manager 128.

At block 306, hypervisor 125 handles the copy-on-write command. The operation of hypervisor 125 at block 306 is described in detail below with respect to FIGS. 10 through 16. In one embodiment, block 305 is performed by VM cloning manager 128.

Figure 4:
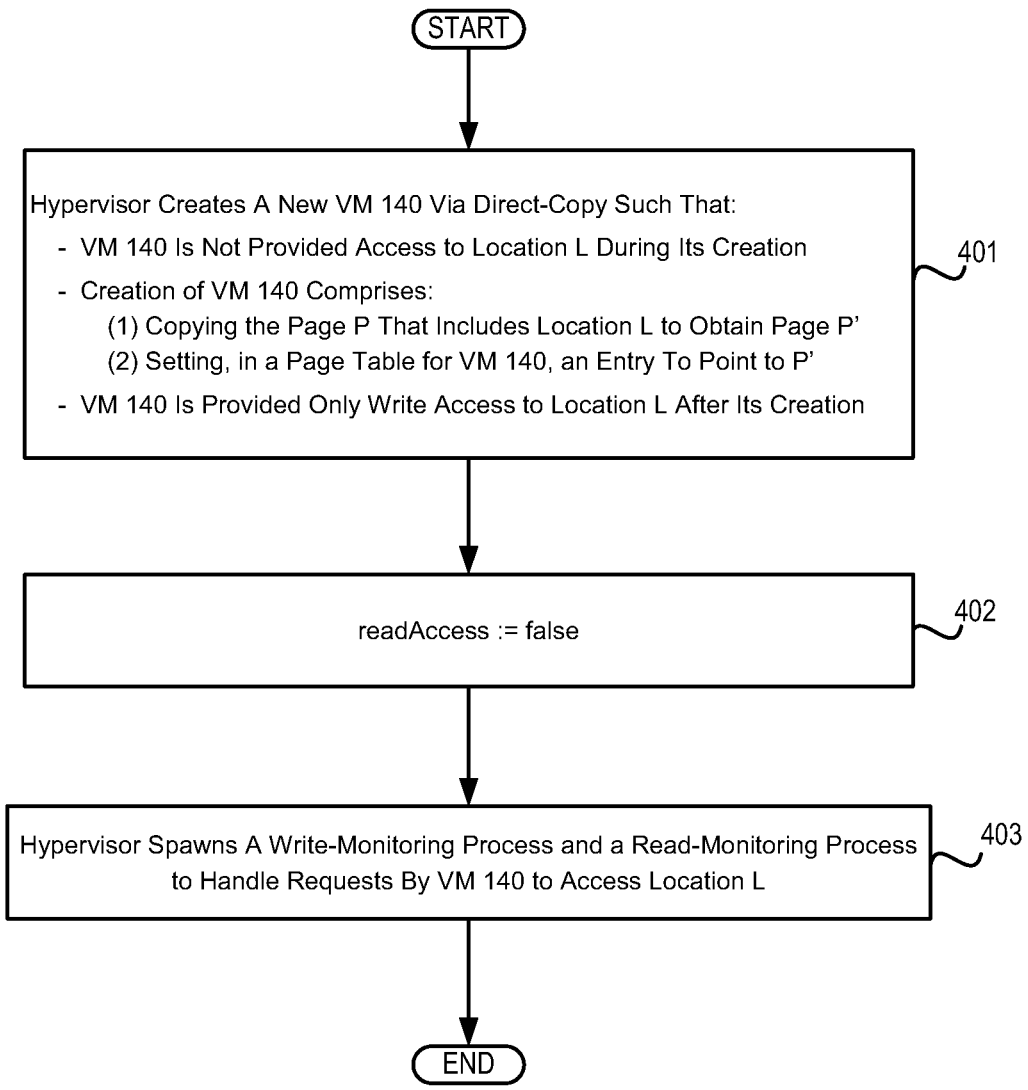
FIG. 4 depicts a flow diagram of an embodiment of a first method for handling a direct-copy command to clone a virtual machine.

FIG. 4 depicts a flow diagram of an embodiment of a first method for handling a direct-copy command to clone a virtual machine. At block 401, hypervisor 125 creates a new virtual machine 140 via direct-copy such that:

virtual machine 140 is not provided access to location L during its creation;
the creation of virtual machine 140 comprises:
copying the page P that includes location L to obtain page P', and
setting, in a page table for virtual machine 140, an entry to point to page P'; and
virtual machine 140 is provided only write access to location L after VM 140 has been created.

In one embodiment, block 401 is performed by VM cloning manager 128. It should be noted that the term "page" is used to refer to a portion of memory (e.g., in main memory such as a Random Access Memory [RAM], in a storage device such as a magnetic disk, etc.) designated by an operating system for storing data. For example, an operating system may divide RAM into page units, and disk devices into sector units. It should also be noted that the term "page table" is used to refer to an entity that enables an operating system and system devices to locate a page that includes specific data. For example, a CPU may use page table entries in RAM to locate memory pages, while an operating system may use a disk directory to locate specific data on a disk.

At block 402, a flag readAccess is initialized to false. At block 403, hypervisor 125 spawns a write-monitoring process and a read-monitoring process to handle requests by virtual machine 140 to access location L. An embodiment of the write-monitoring process and an embodiment of the read-monitoring process are described below with respect to FIGS. 5 and 6, respectively. In one embodiment, block 402 is performed by VM cloning manager 128.

Figure 5:
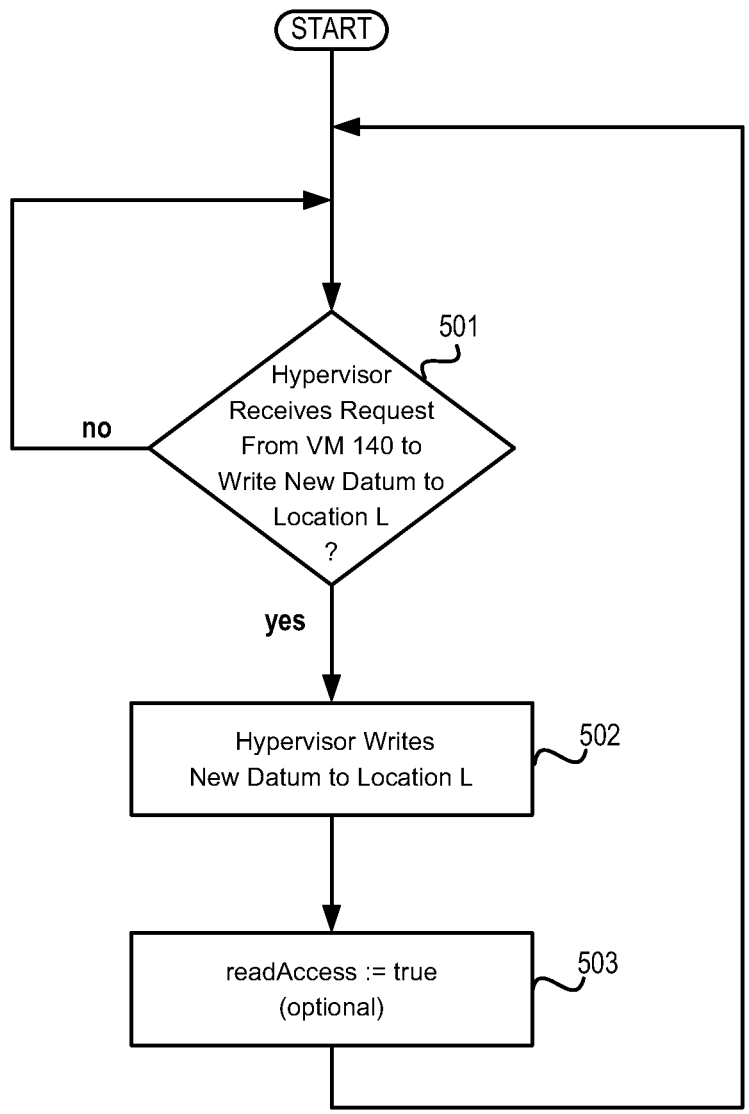
FIG. 5 depicts a flow diagram of an embodiment of a write-monitoring process for handling write requests by a VM clone that is created via direct-copy.

FIG. 5 depicts a flow diagram of an embodiment of a write-monitoring process for handling write requests by a VM clone that is created via direct-copy. Block 501 branches based on whether hypervisor 125 receives a request from VM clone 140 to write a new datum to memory location L. If so, execution proceeds to block 502, otherwise execution continues back at block 501. In one embodiment, block 501 is performed by VM cloning manager 128.

At block 502, hypervisor 125 writes the new datum to memory location L via host OS 120. At optional block 503, flag readAccess is set to true; as will be apparent in the description of FIG. 5 below, which discloses an embodiment of read-monitoring process, when optional block 503 is performed and flag readAccess is set to true, VM clone 140 is subsequently permitted to read the contents of memory location L (e.g., the new datum written at block 502). Conversely, if optional block 503 is not performed, then VM clone 140 remains prohibited from reading the contents of memory location L, even though a new datum (which might not necessarily be secure) has overwritten the secure datum previously stored in location L. After block 503 has been performed (or after block 502 when block 503 is not performed), execution continues back at block 501.

Figure 6:
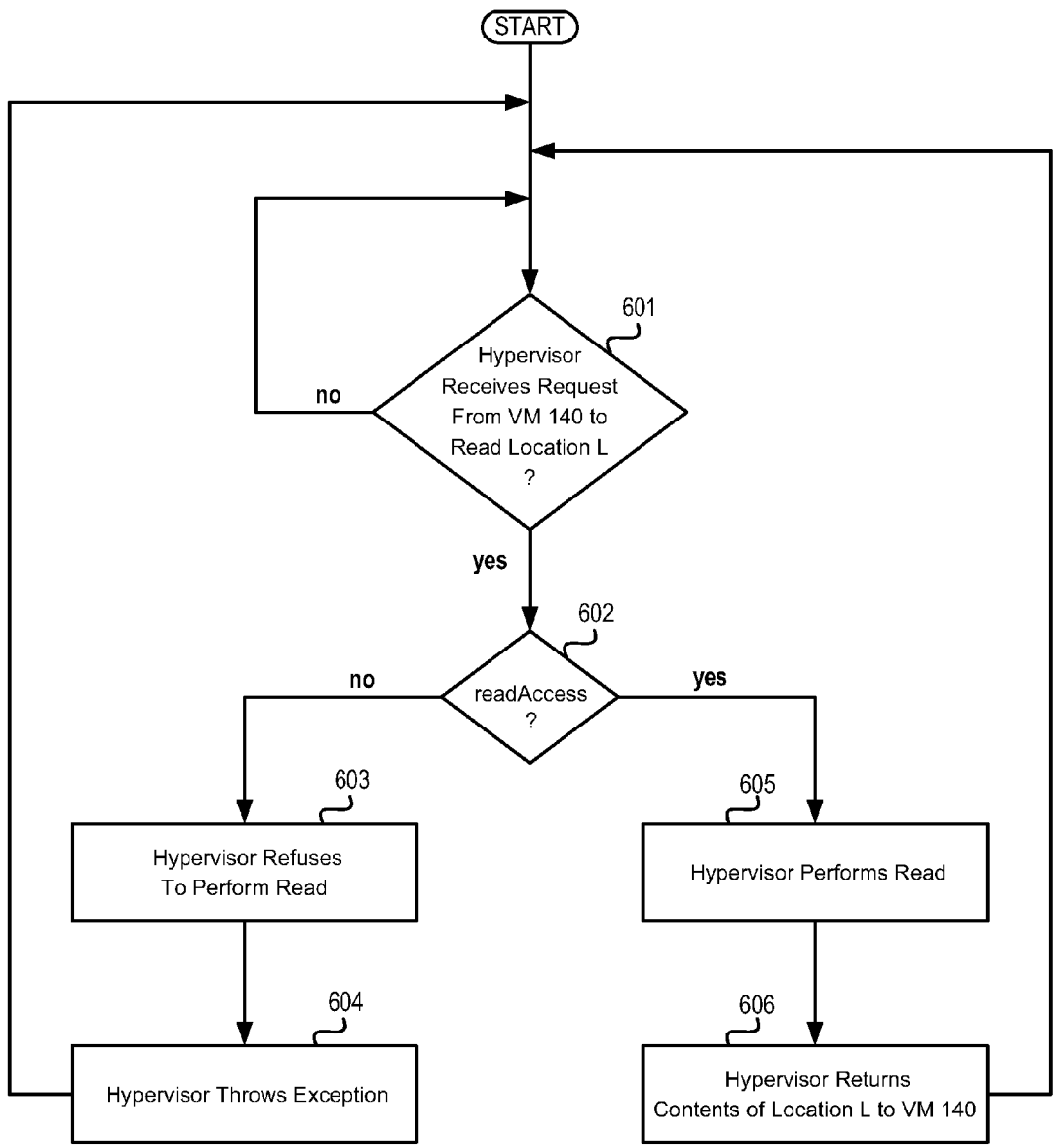
FIG. 6 depicts a flow diagram of an embodiment of a read-monitoring process for handling read requests by a VM clone that is created via direct-copy.

FIG. 6 depicts a flow diagram of an embodiment of a read-monitoring process for handling read requests by a VM clone that is created via direct-copy. Block 601 branches based on whether hypervisor 125 receives a request from VM clone 140 to read the contents of memory location L. If so, execution proceeds to block 602, otherwise execution continues back at block 601. In one embodiment, block 601 is performed by VM cloning manager 128.

Block 602 branches based on the value of flag readAccess. If readAccess is false, execution continues at block 603, otherwise execution continues at block 605.

At block 603, hypervisor 125 refuses to perform the read, and at block 604 hypervisor 125 throws an exception. After block 604, execution continues back at block 601. In one embodiment, blocks 603 and 604 are performed by VM cloning manager 128.

At block 605, hypervisor 125 performs the read via host OS 120, and at block 606 hypervisor 125 returns the contents of memory location L to VM clone 140. After block 606, execution continues back at block 601. In one embodiment, blocks 605 and 606 are performed by VM cloning manager 128.

Figure 7:
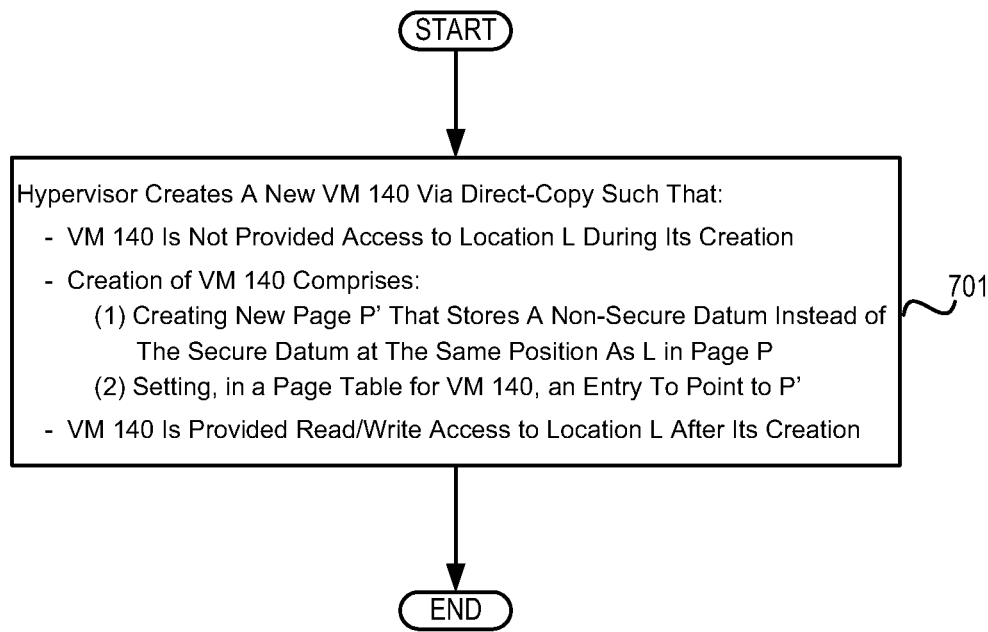
FIG. 7 depicts a flow diagram of an embodiment of a second method for handling a direct-copy command to clone a virtual machine.

FIG. 7 depicts a flow diagram of an embodiment of a second method for handling a direct-copy command to clone a virtual machine. The second method of FIG. 7 differs from the first method of FIG. 4 in that a page table for VM clone 140 is configured so that any attempt by VM clone 140 to read the contents of memory location L results in the reading of a non-secure datum rather than the secure datum. As such, VM clone 140 is provided both read and write access to memory location L after VM clone 140 has been created, and consequently no read-monitoring or write-monitoring processes are necessary.

More particularly, at block 701, hypervisor 125 creates a new virtual machine 140 via direct-copy such that:

virtual machine 140 is not provided access to location L during its creation;

the creation of virtual machine 140 comprises:

creating a new page P' that stores a non-secure datum instead of the secure datum at the same position in page P' as the position of location L in page P, and setting, in a page table for virtual machine 140, an entry to point to page P'; and virtual machine 140 is provided both read and write access to location L after VM 140 has been created.

In one embodiment, block 701 is performed by VM cloning manager 128. It should be noted that in some embodiments, the non-secure datum might be supplied to hypervisor 125 by virtual machine 140, while in some other embodiments the non-secure datum might be obtained by hypervisor 125 in some other fashion (e.g., from an administrator, from a configuration file, etc.).

Figure 8:
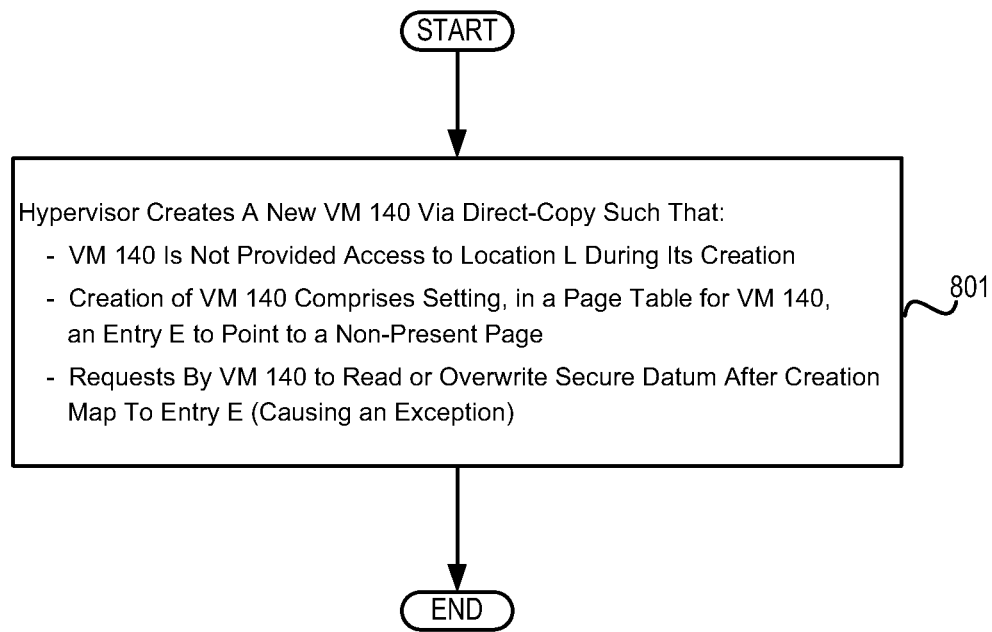
FIG. 8 depicts a flow diagram of an embodiment of a third method for handling a direct-copy command to clone a virtual machine.

FIG. 8 depicts a flow diagram of an embodiment of a third method for handling a direct-copy command to clone a virtual machine. In this third method, the page table for VM clone 140 is configured such that any attempts by VM 140 to access memory location L results in an exception. More particularly, at block 801, hypervisor 125 creates a new virtual machine 140 via direct-copy such that:

virtual machine 140 is not provided access to location L during its creation;

the creation of virtual machine 140 comprises setting, in a page table for virtual machine 140, an entry E to point to a non-present page (e.g., an invalid page address); and requests by virtual machine 140 to read or overwrite the secure datum after VM 140 is created map to entry E, which causes hypervisor 125 to throw an exception .

As in the case of the second method of FIG. 7, no read-monitoring or write-monitoring processes are necessary with this method. In one embodiment, block 801 is performed by VM cloning manager 128.

Figure 9:
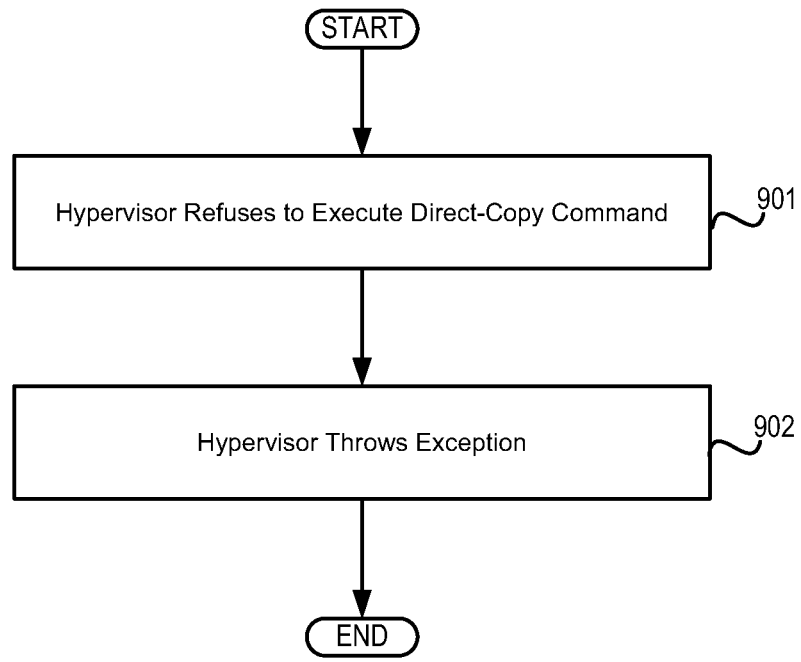
FIG. 9 depicts a flow diagram of an embodiment of a fourth method for handling a direct-copy command to clone a virtual machine.

FIG. 9 depicts a flow diagram of an embodiment of a fourth method for handling a direct-copy command to clone a virtual machine. In this embodiment, hypervisor 125 simply refuses to execute the direct-copy command, at block 901, and throws an exception, at block 902. In one embodiment, blocks 901 and 902 are performed by VM cloning manager 128.

Figure 10:
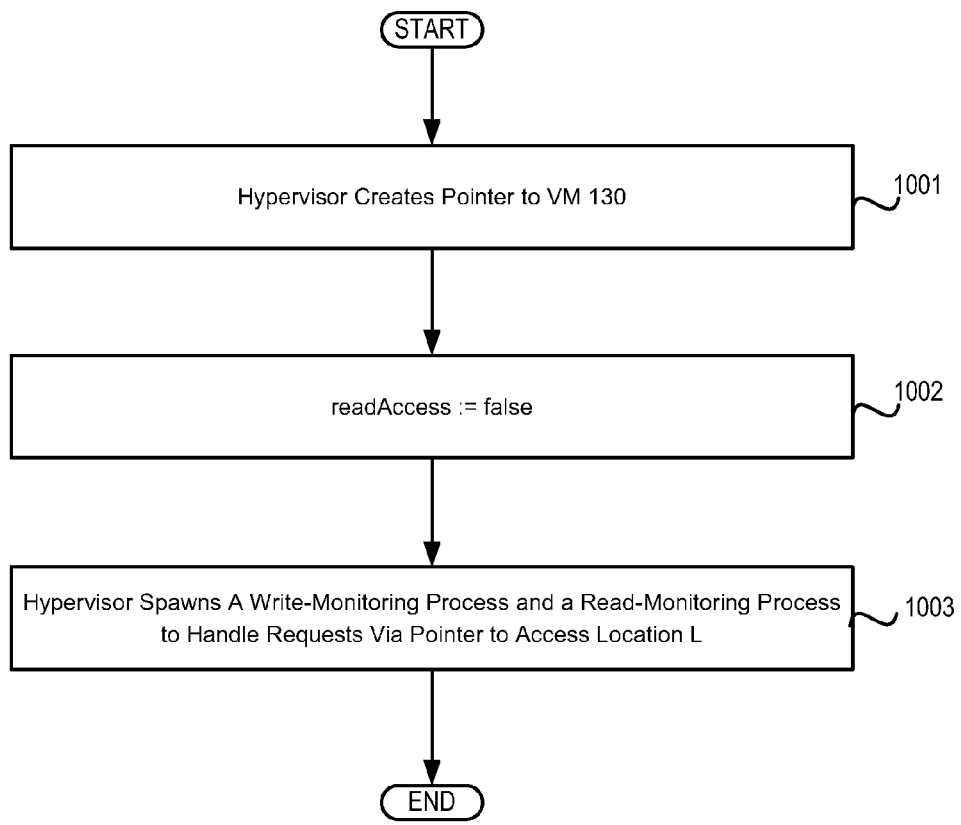
FIG. 10 depicts a flow diagram of an embodiment of a first method for handling a copy-on-write command to clone a virtual machine.

FIG. 10 depicts a flow diagram of an embodiment of a first method for handling a copy-on-write command to clone a virtual machine. At block 1001, hypervisor 125 creates a pointer to virtual machine 130. In one embodiment, block 1001 is performed by VM cloning manager 128.

At block 1002, flag readAccess is initialized to false. At block 1003, hypervisor 125 spawns a write-monitoring process and a read-monitoring process to handle requests to access location L via the pointer created at block 1001. An embodiment of the write-monitoring process is described below with respect to FIG. 11, and two embodiments of the read-monitoring process are described below with respect to FIGS. 12 and 13. In one embodiment, block 1003 is performed by VM cloning manager 128.

Figure 11:
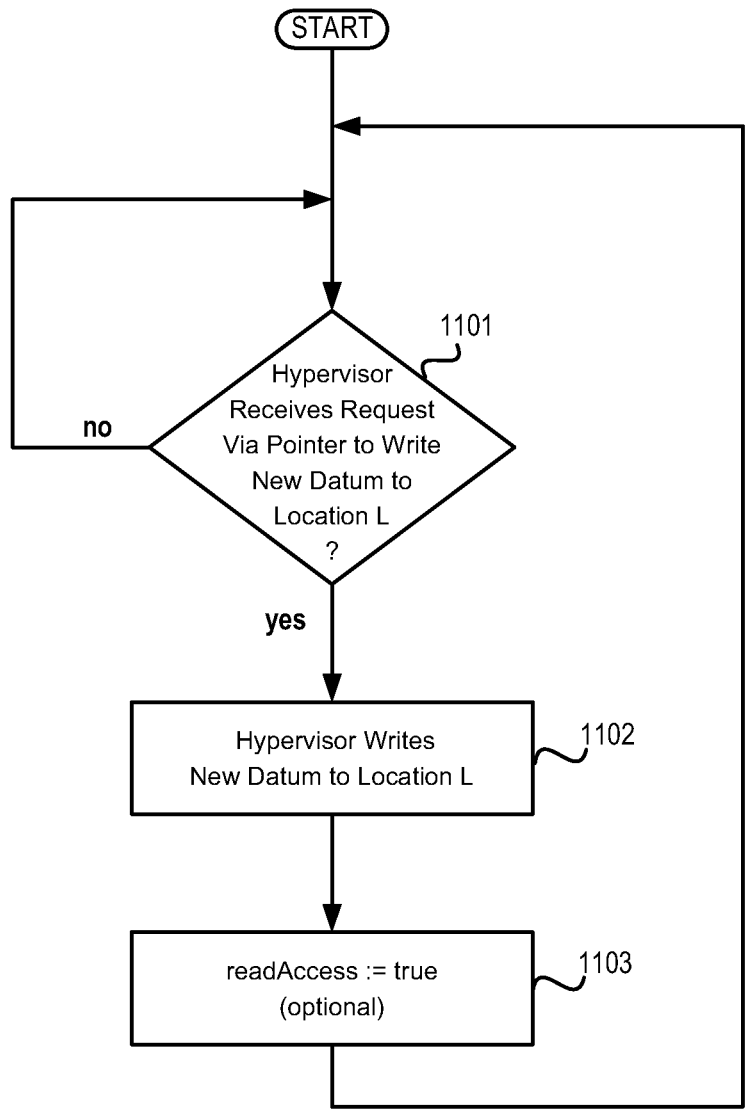
FIG. 11 depicts a flow diagram of an embodiment of a write-monitoring process for handling write requests by a VM clone that is created via copy-on-write.

FIG. 11 depicts a flow diagram of an embodiment of a write-monitoring process for handling write requests by a VM clone that is created via copy-on-write. Block 1101 branches based on whether hypervisor 125 receives a request via the pointer created at block 1001 to write a new datum to memory location L. If so, execution proceeds to block 1102, otherwise execution continues back at block 1101. In one embodiment, block 1101 is performed by VM cloning manager 128.

At block 1102, hypervisor 125 writes the new datum to memory location L via host OS 120. At optional block 1103, flag readAccess is set to true; as in the case of the write-monitoring process of FIG. 5 (for direct-copy), when optional block 1103 is performed and flag readAccess is set to true, VM clone 140 is subsequently permitted to read the contents of memory location L (e.g., the new datum written at block 1102). After block 1103 has been performed (or after block 1102 when block 1103 is not performed), execution continues back at block 1101.

Figure 12:
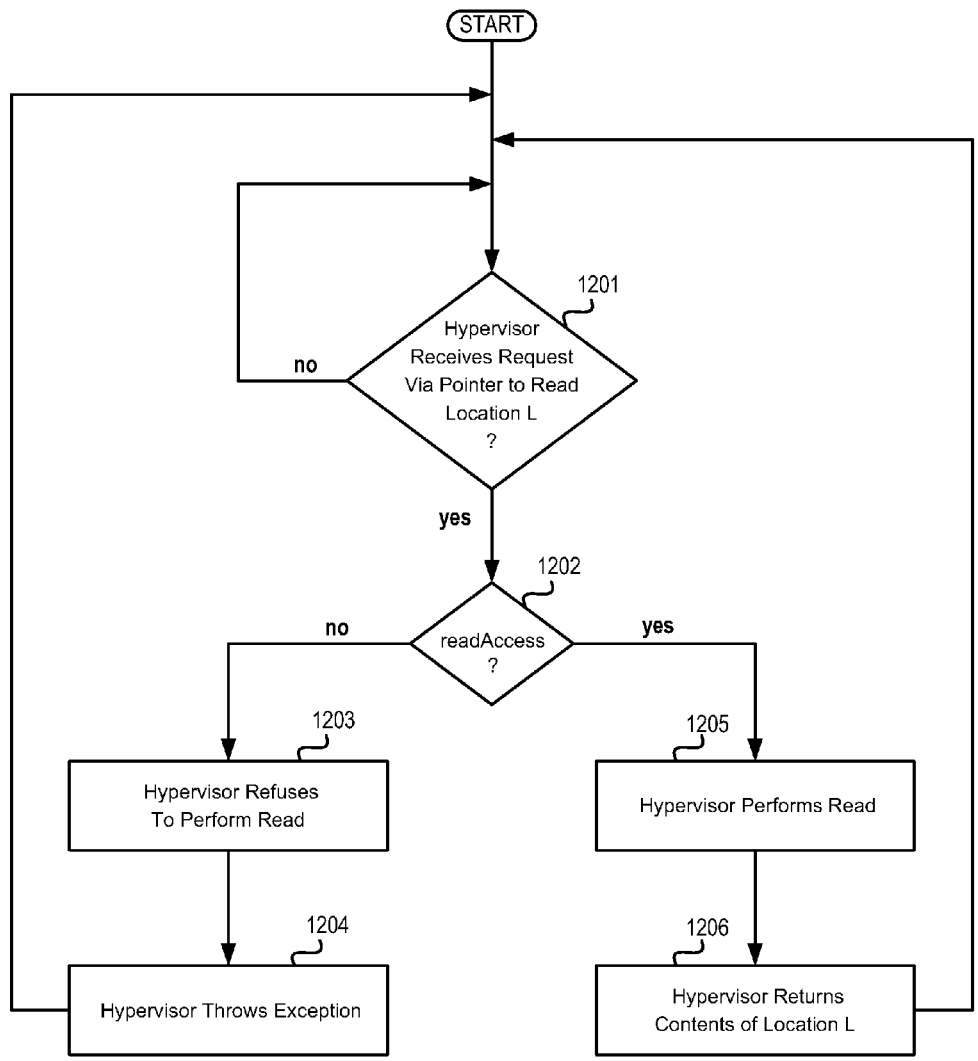
FIG. 12 depicts a flow diagram of an embodiment of a first read-monitoring process for handling read requests by a VM clone that is created via copy-on-write.

FIG. 12 depicts a flow diagram of an embodiment of a first read-monitoring process for handling read requests by a VM clone that is created via copy-on-write. This embodiment is similar to the embodiment of FIG. 6, for direct-copy.

Block 1201 branches based on whether hypervisor 125 receives a request via the pointer created at block 1001 to read the contents of memory location L. If so, execution proceeds to block 1202, otherwise execution continues back at block 1201. In one embodiment, block 1201 is performed by VM cloning manager 128.

Block 1202 branches based on the value of flag readAccess. If readAccess is false, execution continues at block 1203, otherwise execution continues at block 1205.

At block 1203, hypervisor 125 refuses to perform the read, and at block 1204 hypervisor 125 throws an exception. After block 1204, execution continues back at block 1201. In one embodiment, blocks 1203 and 1204 are performed by VM cloning manager 128.

At block 1205, hypervisor 125 performs the read via host OS 120, and at block 1206 hypervisor 125 returns the contents of memory location L to VM clone 140. After block 1206, execution continues back at block 1201. In one embodiment, blocks 1205 and 1206 are performed by VM cloning manager 128.

Figure 13:
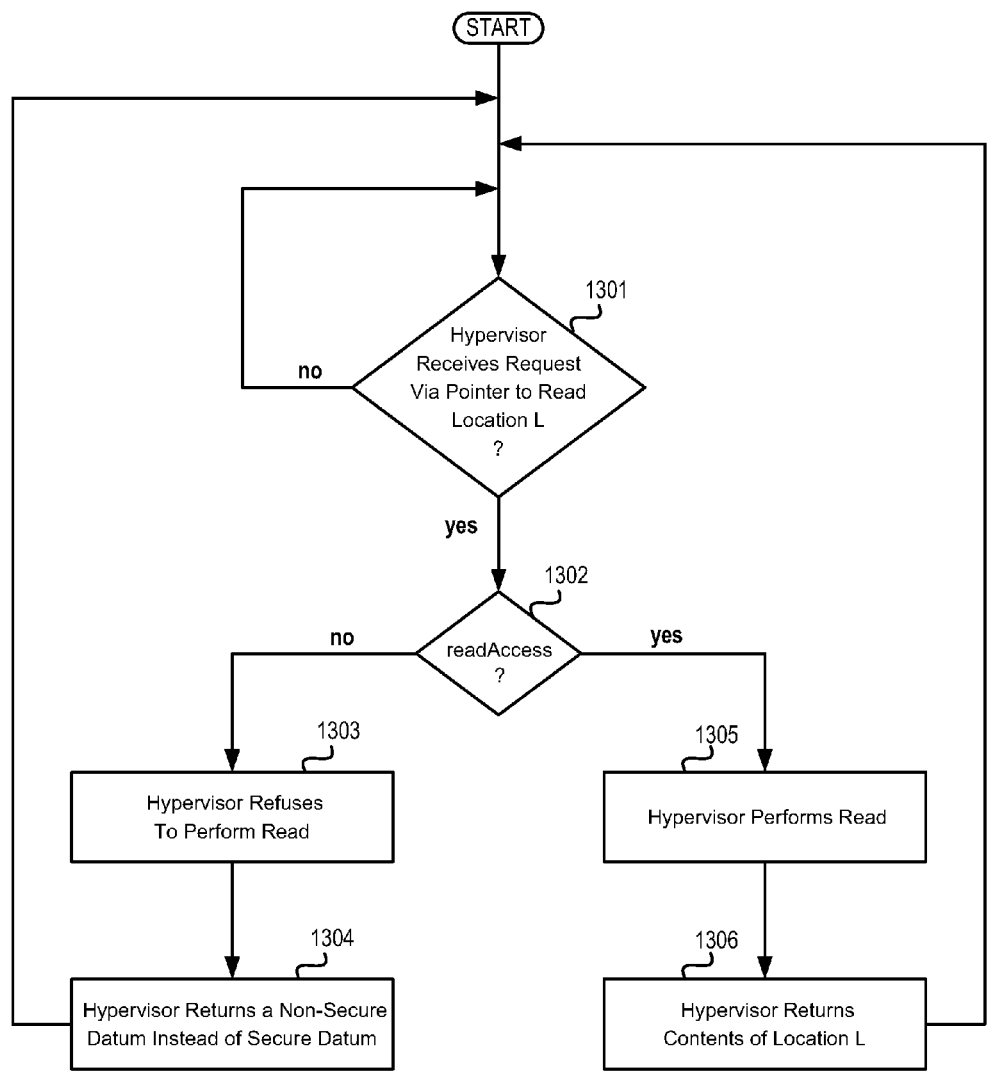
FIG. 13 depicts a flow diagram of an embodiment of a second read-monitoring process for handling read requests by a VM clone that is created via copy-on-write.

FIG. 13 depicts a flow diagram of an embodiment of a second read-monitoring process for handling read requests by a VM clone that is created via copy-on-write. The second read-monitoring process differs from the first read-monitoring process in that, when read access to memory location L via the pointer is not permitted, the hypervisor returns a non-secure datum, rather than throwing an exception.

Block 1301 branches based on whether hypervisor 125 receives a request via the pointer created at block 1001 to read the contents of memory location L. If so, execution proceeds to block 1302, otherwise execution continues back at block 1301. In one embodiment, block 1301 is performed by VM cloning manager 128.

Block 1302 branches based on the value of flag readAccess. If readAccess is false, execution continues at block 1303, otherwise execution continues at block 1305.

At block 1303, hypervisor 125 refuses to perform the read, and at block 1304 hypervisor 125 returns a non-secure datum instead of the secure datum stored at memory location L. After block 1304, execution continues back at block 1301. In one embodiment, blocks 1303 and 1304 are performed by VM cloning manager 128.

At block 1305, hypervisor 125 performs the read via host OS 120, and at block 1306 hypervisor 125 returns the contents of memory location L. After block 1306, execution continues back at block 1301. In one embodiment, blocks 1305 and 1306 are performed by VM cloning manager 128.

Figure 14:
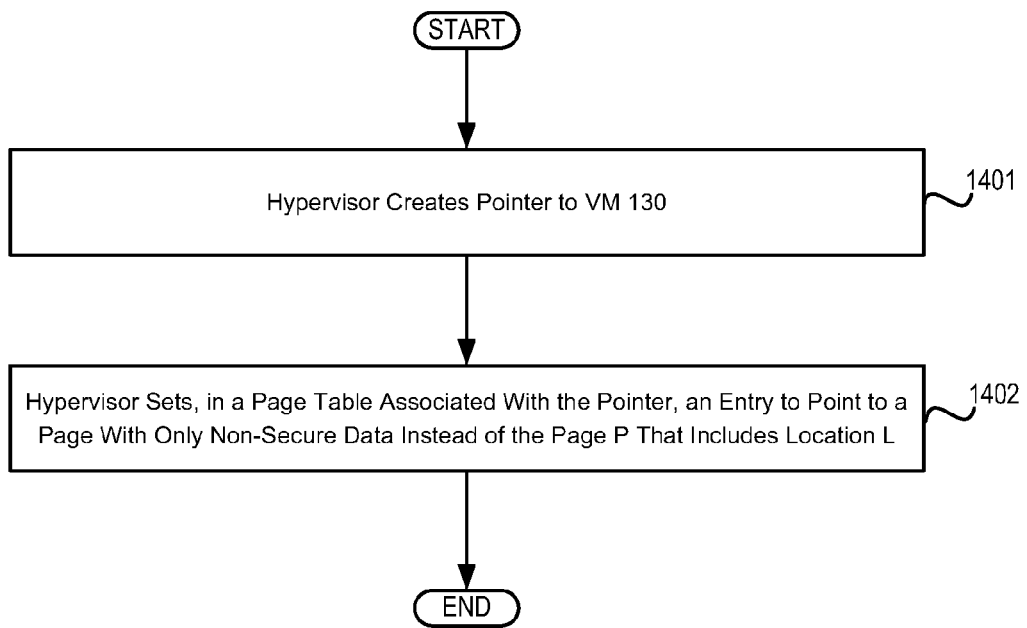
FIG. 14 depicts a flow diagram of an embodiment of a second method for handling a copy-on-write command to clone a virtual machine.

FIG. 14 depicts a flow diagram of an embodiment of a second method for handling a copy-on-write command to clone a virtual machine. In this second method, which bears some similarities to the second method for direct-copy (FIG. 7), hypervisor 125 creates a pointer to virtual machine 130, at block 1401. In one embodiment, block 1401 is performed by VM cloning manager 128.

At block 1402, hypervisor 125 sets, in a page table associated with the pointer, an entry to point to a page with only non-secure data, instead of pointing to the page P that includes location L. In one embodiment, block 1402 is performed by VM cloning manager 128.

Figure 15:
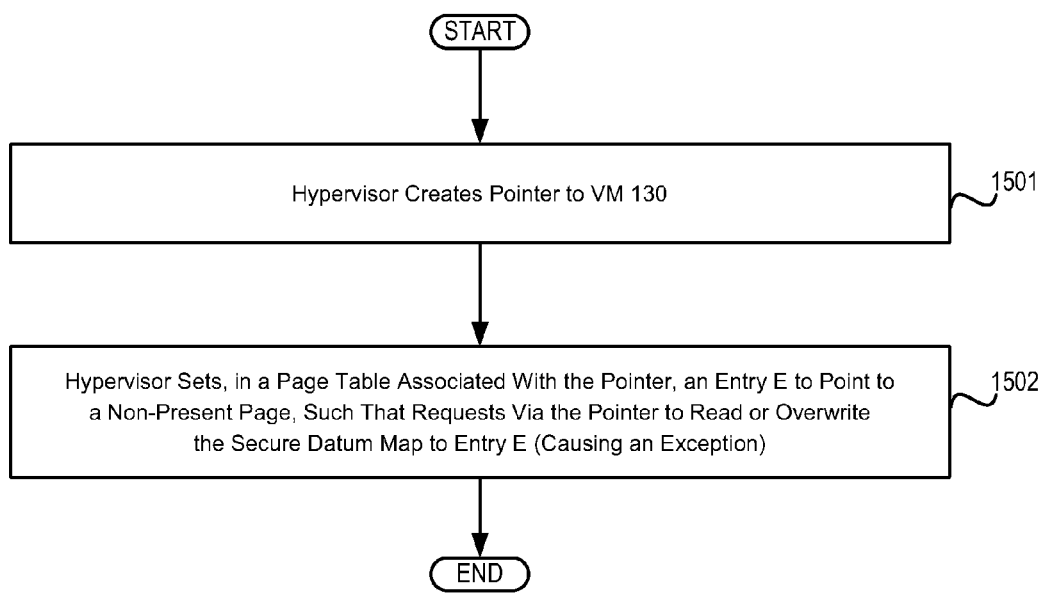
FIG. 15 depicts a flow diagram of an embodiment of a third method for handling a copy-on-write command to clone a virtual machine.

FIG. 15 depicts a flow diagram of an embodiment of a third method for handling a copy-on-write command to clone a virtual machine. In this third method, which bears some similarities to the third method for direct-copy (FIG. 8), hypervisor 125 creates a pointer to virtual machine 130, at block 1501. In one embodiment, block 1501 is performed by VM cloning manager 128.

At block 1502, hypervisor 125 sets, in a page table associated with the pointer, an entry E to point to a non-present page (e.g., an invalid page address), such that requests via the pointer to read or overwrite the secure datum map to entry E, which causes hypervisor 125 to throw an exception. In one embodiment, block 1502 is performed by VM cloning manager 128.

Figure 16:
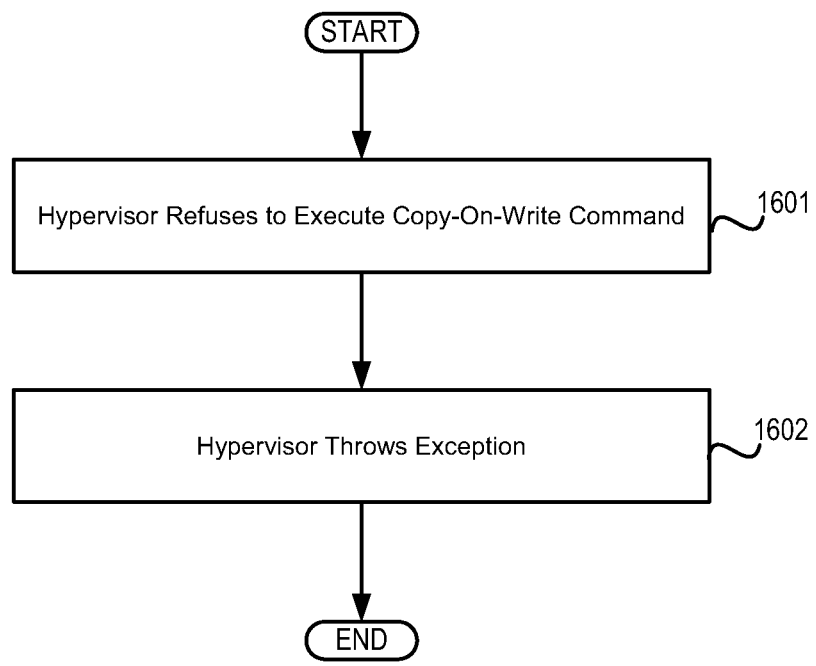
FIG. 16 depicts a flow diagram of an embodiment of a fourth method for handling a copy-on-write command to clone a virtual machine.

FIG. 16 depicts a flow diagram of an embodiment of a fourth method for handling a copy-on-write command to clone a virtual machine. In this fourth method, which is similar to the fourth method for direct-copy (FIG. 9), hypervisor 125 simply refuses to execute the copy-on-write command, at block 1601, and throws an exception, at block 1602. In one embodiment, blocks 1601 and 1602 are performed by VM cloning manager 128.

Figure 17:
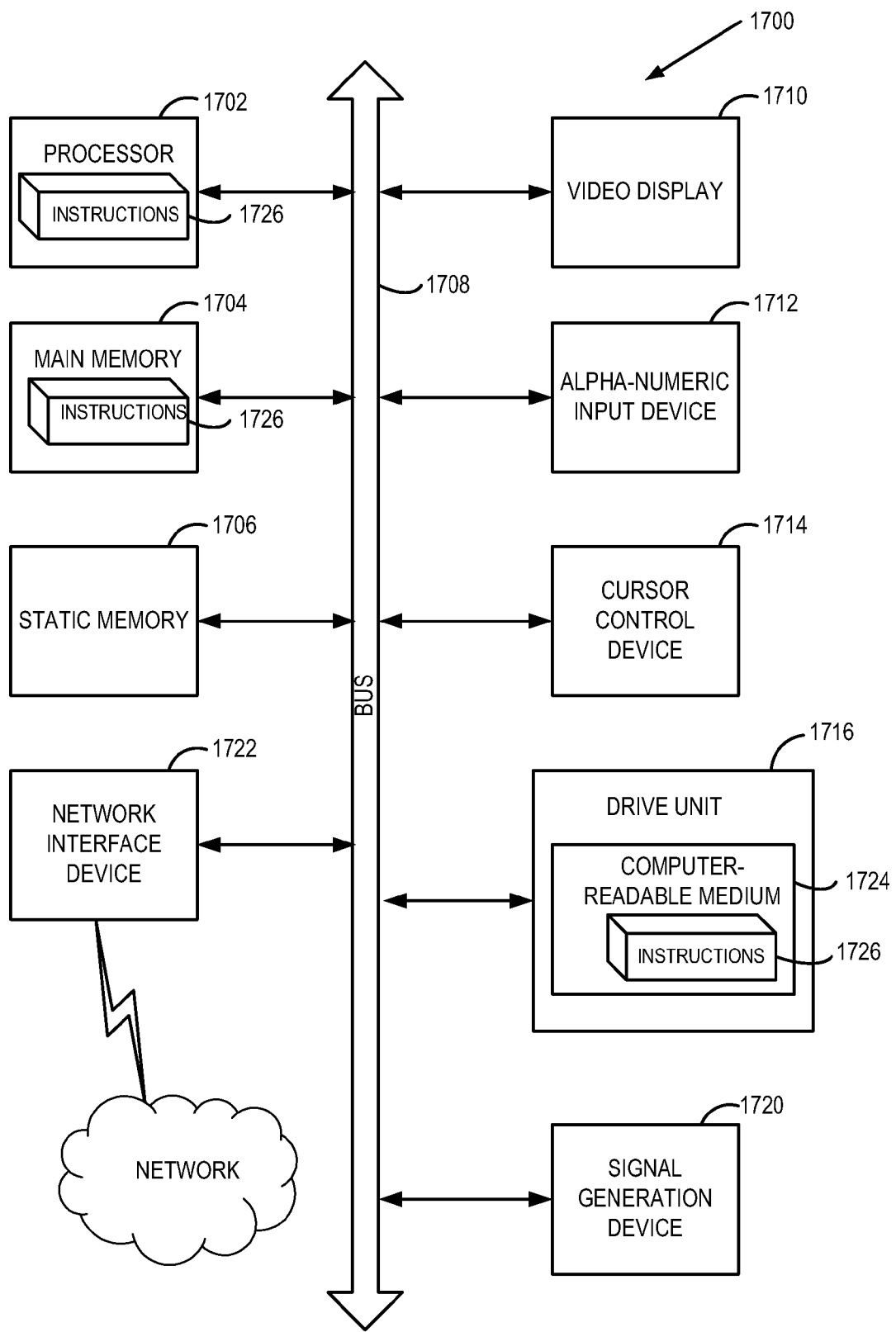
FIG. 17 depicts a block diagram of an illustrative computer system operating in accordance with embodiments of the invention.

FIG. 17 illustrates an exemplary computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1700 includes a processing system (processor) 1702, a main memory 1704 (e.g., read-only memory (ROM), flash memory, dynamic random access memory (DRAM) such as synchronous DRAM (SDRAM)), a static memory 1706 (e.g., flash memory, static random access memory (SRAM)), and a data storage device 1716, which communicate with each other via a bus 1708.

Processor 1702 represents one or more general-purpose processing devices such as a microprocessor, central processing unit, or the like. More particularly, the processor 1702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1702 may also be one or more special-purpose processing devices such as an application specific integrated circuit (ASIC), a field programmable gate array (FPGA), a digital signal processor (DSP), network processor, or the like.

The processor 1702 is configured to execute instructions 1726 for performing the operations and steps discussed herein.

The computer system 1700 may further include a network interface device 1722. The computer system 1700 also may include a video display unit 1710 (e.g., a liquid crystal display (LCD) or a cathode ray tube (CRT)), an alphanumeric input device 1712 (e.g., a keyboard), a cursor control device 1714 (e.g., a mouse), and a signal generation device 1720 (e.g., a speaker).

The data storage device 1716 may include a computer-readable medium 1724 on which is stored one or more sets of instructions 1726 (e.g., instructions corresponding to the method of FIG. 3, etc.) embodying any one or more of the methodologies or functions described herein. Instructions 1726 may also reside, completely or at least partially, within the main memory 1704 and/or within the processor 1702 during execution thereof by the computer system 1700, the main memory 1704 and the processor 1702 also constituting computer-readable media. Instructions 1726 may further be transmitted or received over a network via the network interface device 1722.

While the computer-readable storage medium 1724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
transmitting to a guest operating system of a first virtual machine, by a hypervisor executed by a processing device, a message that identifies a memory location for storing secure data;
receiving by the hypervisor, after the transmitting of the message, a direct-copy command to clone the first virtual machine; and
in response to the direct-copy command, creating, by the hypervisor, a second virtual machine via direct copy of the first virtual machine, wherein the second virtual machine is not provided access to the memory location during the creating of the second virtual machine.

2. The method of claim 1 wherein the guest operating system stores a secure datum in the memory location after receiving the message.

3. The method of claim 1 wherein the second virtual machine is not provided access to read contents of the memory location until a write operation of a new datum to the memory location.

4. The method of claim 1 wherein, in response to a write operation of a new datum to the memory location, the second virtual machine is not provided access to read the new datum from the memory location.

5. The method of claim 1 wherein a request by the second virtual machine to read contents of the memory location causes the hypervisor to throw an exception.

6. The method of claim 1 wherein the memory location is a location in one of: a random access memory, a storage device, or a physical device to which a virtual device of the first virtual machine is mapped.

7. The method of claim 1 wherein a non-secure datum is written to the memory location during the creating of the second virtual machine.

8. The method of claim 7 wherein the non-secure datum is supplied to the hypervisor by the first virtual machine.

9. The method of claim 7 wherein the creating of the second virtual machine comprises:
creating a page that stores the non-secure datum; and
setting, in a page table for the second virtual machine, an entry to point to the page.

10. The method of claim 7 wherein the creating of the second virtual machine comprises setting, in a page table for the second virtual machine, an entry for a non-present page.

11. An apparatus comprising:
a memory; and
a processing device, coupled to the memory, to:
execute a hypervisor,
transmit to a guest operating system of a virtual machine, via the hypervisor, a message that identifies a memory location for storing secure data,
receive via the hypervisor, after the transmitting of the message, a direct-copy command to clone the virtual machine, and
refuse, via the hypervisor, to execute the direct-copy command.

12. The apparatus of claim 11 wherein the processing device is further to throw, via the hypervisor, an exception in response to the direct-copy command.

13. The apparatus of claim 11 wherein the memory is one of a random access memory, a storage device, or a memory of a physical device.

14. A method comprising:
transmitting to a guest operating system of a virtual machine, by a hypervisor executed by a processing device, a message that identifies a memory location for storing secure data;
receiving by the hypervisor, after the transmitting of the message, a copy-on-write command to clone the virtual machine;
in response to the copy-on-write command, creating, by hypervisor, a pointer to the virtual machine;
receiving, via the pointer, a request to read contents of the memory location; and
refusing, by the hypervisor, to execute the request.

15. The method of claim 14 wherein the guest operating system stores a secure datum in the memory location after receiving the message.

16. The method of claim 15 further comprising returning, by the hypervisor, a non-secure datum instead of the secure datum.

17. The method of claim 16 wherein the non-secure datum is supplied to the hypervisor by the virtual machine.

18. The method of claim 14 further comprising throwing, by the hypervisor, an exception in response to the request.

19. The method of claim 14 wherein the guest operating system receives a first request to write a new datum to the memory location, and wherein, in response to the first request, the guest operating system writes the new datum to the memory location, and wherein the guest operating system receives, via the pointer, a second request to read the contents of the memory location, and wherein, in response to the second request, the guest operating system returns the new datum.

20. The method of claim 14 wherein the guest operating system receives a first request to write a new datum to the memory location, and wherein, in response to the first request, the guest operating system writes the new datum to the memory location, and wherein the guest operating system receives, via the pointer, a second request to read the contents of the memory location, and wherein the hypervisor refuses to execute the second request.

21. The method of claim 14 further comprising, in response to the copy-on-write command:
setting, in a page table associated with the pointer, an entry to point to a page with only non-secure data instead of a page that includes the memory location.

22. The method of claim 14 further comprising, in response to the copy-on-write command:
setting, in a page table associated with the pointer, an entry for a non-present page instead of a page that includes the memory location.

23. A non-transitory computer readable storage medium, having instructions stored therein, which when executed, cause a processing device to perform operations comprising:
transmitting to a guest operating system of a virtual machine, by a hypervisor executed by the processing device, a message that identifies a memory location for storing secure data;
receiving by the hypervisor, after the transmitting of the message, a copy-on-write command to clone the virtual machine; and
refusing, by the hypervisor, to execute the copy-on-write command.

24. The non-transitory computer readable storage medium of claim 23, wherein the guest operating system stores a secure datum in the memory location after receiving the message.

25. The non-transitory computer readable storage medium of claim 23, wherein the operations further comprise throwing, by the hypervisor, an exception in response to the copy-on-write command.

26. The non-transitory computer readable storage medium of claim 23, wherein the memory location is a location in one of: a random access memory, a storage device, or a physical device to which a virtual device of the virtual machine is mapped.

\* \* \* \* \*